United States Patent [19]

Serpelloni et al.

[11] Patent Number: 4,675,200

[45] Date of Patent: Jun. 23, 1987

[54] SUGARLESS ICE CREAM AND PROCESS FOR PRODUCING IT

[75] Inventors: Michel Serpelloni, Bethune, France; Guy Bussiere, La Gorgue, both of France

[73] Assignee: Roquette Freres, Lestrem, France

[21] Appl. No.: 697,472

[22] Filed: Feb. 1, 1985

[30] Foreign Application Priority Data

Feb. 7, 1984 [FR] France .................................. 84 01802

[51] Int. Cl.$^4$ .............................................. A23G 9/02
[52] U.S. Cl. .................................... 426/567; 426/658; 426/804
[58] Field of Search ............... 426/567, 565, 804, 548, 426/658

[56] References Cited

U.S. PATENT DOCUMENTS

| Re. 26,959 | 9/1970 | Conrad | 426/548 |
|---|---|---|---|
| 2,437,080 | 3/1948 | Daniel | 426/491 |
| 2,876,104 | 3/1959 | Bliudzius | 426/804 |
| 3,914,441 | 10/1975 | Finney et al. | 426/567 |
| 3,928,649 | 12/1975 | Cobb | 426/804 |
| 4,024,290 | 5/1977 | Layton | 426/565 |
| 4,049,832 | 9/1977 | Hayward et al. | 426/72 |
| 4,279,931 | 6/1981 | Verwaerde et al. | 426/658 |
| 4,333,954 | 6/1982 | Trzecieski | 426/565 |
| 4,368,211 | 2/1983 | Blake et al. | 426/567 |
| 4,400,405 | 8/1983 | Morley | 426/567 |

FOREIGN PATENT DOCUMENTS

| 899143 | 5/1972 | Canada | 426/658 |
|---|---|---|---|
| 629306 | 9/1949 | United Kingdom . | |
| 1239056 | 7/1971 | United Kingdom . | |
| 2072679 | 12/1980 | United Kingdom | 426/658 |

OTHER PUBLICATIONS

Dairy Industries, vol. 39, No. 4, Apr. 1974; A.-G. Bundgaard: "Hyperfiltration of Skim Milk for Ice Cream Manufacture", pp. 119-122.

Primary Examiner—Jeanette Hunter
Attorney, Agent, or Firm—Larson and Taylor

[57] ABSTRACT

Sugarless ice cream characterized by the fact that it comprises, as sweetening and texture forming agent, a polyol content of DP equal to or higher 3, higher than 2%, preferably than 3% or more preferably still than 6% and less than 15%, preferably than 12% by weight with respect to dry matter in the finished product.

19 Claims, No Drawings

SUGARLESS ICE CREAM AND PROCESS FOR PRODUCING IT

BACKGROUND OF THE INVENTION

The invention relates to a sugarless ice cream; it also relates to the process for preparing it.

By the term "sugarless" is meant, in the confectionery field, articles which contain neither saccharose, nor dextrose, nor fructose, nor glucose syrups, these sugars being replaced by polyols such as xylitol, mannitol, maltitol, sorbitol, or hydrogenated starch hydrolysates, sorbitol being by far the most utilised.

Thus there is currently found on the market, sugarless confectionery such as hard candy, jelly gums, chewing gums and bubble gums, marshmallows, pastilles or tablets. This confectionery is marketed for its dietetic properties and/or its hypocariogenic qualities.

So-called dietetic sugarless ice creams are also found which are formulated by resorting to at least certain of the above-mentioned sugar substitutes.

It happens that these sugarless ice creams do not in any way show either the characteristics of texture, nor the taste characteristics of conventional ice cream; in particular, their characteristics of body, of melting, of unctuosity and of firmness in the mouth are not satisfactory.

It is a particular object of the invention to provide a sugarless ice cream which responds to the requirements of the confectionery and dairy industries by providing a sugarless ice cream whose physical, textural and organoleptic characteristics approach those of traditional ice creams prepared with saccharose.

GENERAL DESCRIPTION OF THE INVENTION

Applicants have had the merit of discovering that the incorporation in the formulation of sugarless ice cream of a predetermined proportion of certain hydrogenated oligosaccharides or polysaccharides enabled the organoleptic and textural characteristics to be very substantially improved, these characteristics approaching those of a traditional ice cream.

The hydrogenated oligosaccharides or polysaccharides concerned are polyols which have a degree of polymerisation or DP equal to or greater than 3; in order that the desired properties may be obtained, said polyols must be present in a proportion expressed by dry matter in the finished product higher than 2%, preferably than 3% or more preferably higher than 6% by weight and less than 15%, preferably than 12% by weight.

They may be introduced in the form of hydrogenated starch hydrolysates or HSH having a DE (dextrose equivalent) before hydrogenation comprised between 25 and 75 and, preferably, between 30 and 60, the composition of said HSH, expressed in dry matter, being as follows:

sorbitol (DP 1): 0.1 to 35%, preferably 0.1 to 19%
maltitol (DP 2): 8 to 80%, preferably 20 to 75%
polyols of DP$\geq$3: complement to 100.

Consequently, the sugarless ice cream according to the invention is characterized by the fact that it comprises, as sweetening and textural agent, a content of polyols of DP equal to or higher than 3, higher than 2%, preferably than 3% and more preferably higher than 6% and less than 15%, preferably than 12% by weight expressed in dry mater in the finished product.

The process, according to the invention, for preparing the abovesaid sugarless ice cream, is characterised by the fact that there are added to the conventional ingredients of the ice cream namely skimmed milk, fats, stabilisers and emulsifiers, flavors artificial sweeteners and the like, in amount of polyols of DP$\geq$3 such that the content of the resulting ice cream in these polyols is higher than 2%, preferably than 3%, more preferably higher than 6% and less than 15%, preferably than 12% by weight expressed in dry mater in the finished product, these polyols being advantageously introduced in the form of an HSH having, before hydrogenation, a DE comprised between 25 and 75, preferably between 30 and 60, the composition of the HSH being as follows:

sorbitol (DP 1): 0.1 to 35%, preferably 0.1 to 19% maltitol (DP 2): 8 to 80%, preferably 20 to 75% polyols of DP$\geq$3: complement to 100.

The proportion of HSH thus introduced into the ice cream according to the invention varies as a function of the composition of this HSH as well as a function of the nature and of the amount of the simple polyols remaining possibly present in the cream.

In practice, a content comprised between 4.5% and 28%, preferably between 6 and 23%, the percentages being expressed by weight of dry matter expressed in dry mater in the finished product, enables the best compromise to be obtained between the properties of taste, of sweetening power, of texture and of "firmness in the mouth".

According to an advantageous embodiment of the invention and suited to improve still further the hypocariogenic properties of the sugarless ice cream according to the invention, the latter has a lactose content less than 1% by weight on dry matter with respect to the finished product.

To prepare such a cream, there is introduced into the composition of the latter, during its preparation and in place of conventionally used milk products, particularly skimmed milk, an amount of 3 to 8% and, preferably, from 4 to 7% by weight with respect to the finished product, of dairy protein concentrates containing little or no lactose and which can be selected from the group comprising:

caseinates,
ultra-filtered milk proteins,
ultra-filtered serum proteins,
buttermilk and ultra-filtered buttermilk,
heat-coagulated delactosed serum proteins.

The use of these milk protein concentrates enables the hypocariogenic properties of the sugarless ice creams according to the invention to be reinforced whilst preserving in the product a pleasant milky flavour, generally sought by the consumer and customarily introduced by the lactose which is present in the milk products traditionally employed for the manufacture of ice creams.

According to another advantageous embodiment and still for the purpose of improving the hypocariogenic properties of the finished product, there are introduced, in the process according to the invention, hydrogenated oligosaccharides and polysaccharides of DP$\geq$3 in the form of an HSH whose composition is as follows:

sorbitol: 0.1 to 19%
maltitol: 35 to 80%, preferably 40 to 60%
polyols of DP>20: percentage less than 3%
polyols of DP ranging from 3 to 20: complement to 100%.

DESCRIPTION OF PREFERRED EMBODIMENTS

The invention will be still better understood by means of the following comparative examples in which the superiority of the ice creams according to the invention will be brought out by means of a set of so-called "quality" tests and which comprise:

a penetrability test,
a melting test and
a taste test.

The ice cream samples, subjected to these tests are obtained from the expanded product combining all the constituents of the cream, this expanded product being hardened at −40° C. for three hours and then preserved at −20° C. for at least 48 hours to result in complete freezing.

(a) Description of the penetrability test.

This test is carried out by means of a penetrometer, of the SUR-BERLIN 8 brand.

It consists of allowing a body to sink into a specimen of ice cream.

The penetrating body is constituted by an ebonite cone having an angle at the tip of 40°, extended by an axis, the whole weighing 159.8 g.

The penetration experiment lasts 15 seconds and is done at room temperature.

The specimen is preserved at −20° C. in a 100 cm$^3$ plastic pot with an internal diameter of 55 mm, not including a lid, this pot being placed in a larger pot, provided with a cover, due to which the flat surface of the sample of ice cream is not modified.

5 hours 30 minutes before measurement, the samples preserved at −20° C. are brought to −15° C.

The penetrability test is applied to 15 specimens.

A single measurement is made on each specimen and the penetrability is expressed by the average value of the measurements carried out on the 15 specimens, expressed in millimeters.

The measurement is carried out in the minimum of time so that the ice cream does not undergo a commencement of melting, which would disturb the results.

The lower acceptability limit is 10 mm. Below, the ice is considered as too hard.

The upper acceptability limit is 18 mm. Above, the ice is considered as too soft.

(b) Description of the melting test.

This test consists of measuring the proportion of ice cream melted in the course of time under the conditions defined below.

The measurement is done by means of a system of weighing placed inside an oven at +30° C. and at 60% relative humidity.

To carry out this test, there is taken up, from one of the samples of ice cream preserved at −20° C., a cylindrical sample core by means of a stainless steel cylindrical hollow punch 42 mm in height and 25 mm in internal diameter, of which the outer wall has previously been covered with a sheet of cellophane. This permits the ice cream not to stock to the outer wall of the cylinder during the sample taking.

Then, the cellophane is removed and the cylinder with the sample of ice cream is placed inside a pot provided with a cover, the whole being maintained at −20° C. for 3 hours 30 minutes in a freezer in order to bring the ice cream sample to the right temperature.

The cylinder containing the ice cream is then placed inside the abovesaid oven, on a grid with square meshes of 5 mm side and, by means of a weighing system, the amount of ice cream melted as a function of time is measured.

The result of the tests is characterised by two values, one expressing the time necessary for the appearance of the first drop melted, the other expressing the time necessary for the melting of 60% of the weight of the specimen.

The lower acceptibility limit relating to the time necessary for the melting of 60% of the weight of the specimen is 17 minutes 30 seconds. Below this value, the ice melts too quickly and its body is judged insufficient, the unctuosity being too low.

(c) Description of the tast test.

Each taster of a taste panel must proceed with the tasting of three specimens of each ice cream previously brought to the temperature of −15° C.

They must apply
a mark of 0 to 10 to
  the sweet flavour
  cutting resistance
  melting speed
a mark of 0 to 5 to
  fluidity and the viscosity
  the granulosity and the unctuosity.

EXAMPLE 1

This example sets up a comparison between
a traditional ice cream, based on skimmed milk, saccharose and glucose syrup,
a conventional sugarless ice cream with sorbitol and
two sugarless ice creams according to the invention both including a hydrogenated starch hydrolysate.

1. Traditional Saccharose Ice Cream

The composition of this ice cream was as follows:

| | |
|---|---|
| Saccharose | 15.5% by weight |
| Anhydrous milk fat | 8.4% by weight |
| Skimmed milk | 10.0% by weight |
| Dehydrated glucose syrup 40 DE | 4.5% by weight |
| Integrated stabiliser emulsifier marketed by GRINSTED PRODUCTS under the trademark CREMODAN SE 30 F | 0.48% by weight |
| Vanilla flavouring, marketed MERO by the MERO Company | 0.35% by weight |
| Water | q.s.p. 100%. |

The saccharose, the glucose 40 DE syrup, the skimmed milk and the integrated stabiliser emulsifier were at first mixed in the dry state in order to avoid the formation of lumps during the incorporation of the water.

Then, this mixture is gradually dispersed with rapid stirring in water contained in a tank provided with a double heating jacket.

The whole is preheated to 50° C., the temperature at which the fat is incorporated.

The preparation is continued by pasteurising for three minutes at 80° C., then by homogeneisation at 75° C., under an input pressure of 150 kg/cm and an outlet pressure of 50 kg/cm.

The mixture thus formed is cooled to 4° C., then left to stand for 1 hour to reach maturity at this temperature with slow stirring. The vanilla flavouring is then added.

The expanded product is hardened at −40° C. for 3 hours, then preserved at −20° C. for at least 48 hours in order to obtain perfect freezing of the ice cream before proceeding with the quality tests described above.

The results obtained with the saccharose type ice cream defined above are summarised in Table I.

2. Sugarless Ice Cream With Sorbitol

The composition, by weight, of this ice cream is as follows:

| | |
|---|---|
| Sorbitol syrup with 70% dry matter | 28.6% by weight |
| Anhydrous milk fat | 8.4% by weight |
| Skimmed milk | 10.0% by weight |
| Stabiliser Emulsifier CREMODAN SE 30F | 0.48% by weight |
| Aspartam | 0.02% by weight |
| MERO Vanilla flavour | 0.35% by weight |
| Water | q.s.p. 100%. |

The sorbitol syrup used in this example as well as in the following examples has the following composition, percentages being expressed by weight with respect to dry matter:

| | |
|---|---|
| Products of DP 1 | 84% |
| Products of DP 2 | 10.5% |
| Products of DP 3 | 3% |
| Products of DP $\geq$ 3 | 2.5%. |

The content of this ice cream in polyols of DP$\geq$3 is hence equal to 1.10%.

This ice cream is prepared as follows:

First of all the powder comprising stabilised emulsifier and the skimmed milk are dispersed in the water-sorbitol syrup mixture, when the whole is heated to 50° C.

To this mixture of the three constituents in water is added the anhydrous fat before proceeding with pasteurisation for 3 minutes at 80° C.

The product is then homogeneised at 75° C. at pressure of 150 kg/cm at the input and 50 kg/cm at the outlet.

The homogeneised mixture is then cooled to 4° C. and kept at this temperature for 1 hour with slow stirring.

At this stage the vanilla flavouring and the aspartam are added. The expansion is about 100%. At this stage it is already observed that the ice cream is much softer than the saccharose type control cream.

Finally, the finished product is hardened at −40° C. for three hours, then preserved at −20° C. for 48 hours.

The quality tests then follow, of which the results are indicated in Table I.

3. Ice Cream According to the Invention

Two sugarless ice creams including two different proportions of hydrogenated starch hydrolysate were prepared, the compositions being as follows:

| | Cream No.1 | Cream No.2 |
|---|---|---|
| HAH with 75% D.M. (dry matter) | 23.2 | 10.4 |
| Anhydrous milk fat | 8.4 | 8.4 |
| Skimmed milk | 10 | 10 |
| Sorbitol syrup with 70% D.M. | 3.7 | 10.3 |
| Stabiliser emulsifier CREMODAN SE 30F | 0.48 | 0.48 |
| Aspartam | 0.02 | 0.02 |
| MERO vanilla flavouring | 0.35 | 0.35 |
| Water | qsp 100% | qsp 100%. |

The HSH used, of DE before hydrogenation close to 50, had the following composition (percent by weight on dry matter):

| | |
|---|---|
| Sorbitol | 7.0 |
| Maltitol | 52.5 |
| DP 3 | 18 |
| DP 3 to 20 | 21.5 |
| DP > 20 | 1. |

The process of preparation is that as described above with respect to the saccharose and sorbitol type ice creams, the HSH being added at the same time as the sorbitol syrup.

Ice cream No. 1 had a dry matter of 38.9%, similar to that of the two previously prepared creams, and cream No. 2 had a dry matter of 33.9%.

In both cases, the ice cream was firm at the outlet from the freezer and its hardness was comparable with that of the saccharose type control cream.

Cream No. 1 had a content of polyols of DP$\geq$3 equal to 7.19% and the ice cream No. 2 a content equal to 3.55%.

The results of the quality tests carried out on these two ice creams are also collected in Table I.

TABLE I

| | D.M. % | PENETRABILITY (in mm) | MELTING | | TASTE | | | | |
|---|---|---|---|---|---|---|---|---|---|
| | | | Appearance of first drop (in min.) | 60%* melted (m min.) | Sweet Flavor** | Cutting Resistance** | Melting Speed** | Viscosity Fluidity*** | Granulosity Unctuosity*** |
| Saccharose Type Ice Cream | 39.25 | 12.6 | 9'25 | 24'30 | 6 | 5 | 6 | 3.6 | 3.6 |
| Sorbitol Type Ice Cream | 39.25 | 17.8 | 7'30 | 16'50 | 6.3 | 3 | 8 | 2.7 | 2 |
| Ice Cream No. 1 | 39.25 | 12.6 | 9'45 | 25' | 5.8 | 5.7 | 6 | 3.8 | 4.2 |
| Ice Cream No. 2 | 34.25 | 11.16 | 11' | 32'30 | 5 | 5.9 | 6.2 | 3.6 | 3.8 |

*Time necessary for 60% by weight of the ice cream to be melted
**Marks from 0 to 10
***Marks from 0 to 5

It results from the indications collected in Table I that sorbitol type ice cream melts too quickly and that it does not have sufficient unctuosity.

The taste panel attributed to it an unctuosity mark equal to 2 out of 5 whilst it attributed a very substantially higher mark to the ice creams according to the invention No. 1 and No. 2, which were favourably compared with saccharose type ice cream. The ice cream No. 1 was adjudged as being the better.

EXAMPLE 2

This example sets up a comparison between a saccharose type ice cream, a sorbitol type ice cream and two ice creams according to the invention, the milky fraction being constituted by a mixture of delactosed proteins in placed of skimmed milk.

1. Saccharose Type Control Ice Cream

Its composition by weight is as follows:

| | |
|---|---|
| Saccharose | 15.5% by weight |
| Anhydrous milk fat | 8.4% by weight |
| 60 DE Glucose syrup with 80% D.M. | 6.3% by weight |
| Mixture of delactosed milk proteins, marketed by the BEL INDUSTRIES Company under the name NOLLIBEL P70 | 5.3% by weight |
| Dehydrated glucose syrup 40 DE | 4.5% by weight |
| Stabiliser Emulsifier CREMODAN SE 30F | 0.48% by weight |
| MERO Vanilla flavouring | 0.35% by weight |
| Water | qsp 100%. |

The production process is identical with that of example 1.I, apart from the fact that the mixture comprising the saccharose, the 40 DE glucose syrup, the protein concentrate and the stabiliser emulsifier is dispersed in the mixture of 60 DE glucose syrup and water.

Quality tests followed whose results are collected in Table II.

2. Sorbitol Type Ice Cream

Its composition by weight was as follows:

| | |
|---|---|
| Sorbitol syrup with 70% dry matter | 35.7% by weight |
| Anhydrous milk fat | 8.4% by weight |
| Delactosed milk proteins mixture NOLLIBEL P70 | 5.3% by weight |
| Stabiliser Emulsifier CREMODAN SE 30F | 1% by weight |
| Aspartam | 0.02% by weight |
| MERO Vanilla flavouring | 0.35% by weight |
| Water | qsp 100%. |

It is noted that the amount of integrated stabiliser-emulsifier had to be considerably increased in order to try to compensate for the obvious loss of uncutuosity of the ice cream due to the employment of the sorbitol.

The process of preparing this ice cream is as follows.

In the water-sorbitol syrup mixture are first of all dispersed the powder comprising the stabiliser-emulsifier and the mixture of delactosed milk proteins. The whole is then heated to 50° C.

To this mixture of three of the constituents in water, are added the anhydrous fat before proceeding with pasteurisation of 3 minutes at 80° C.

The product is then homogeneised at 75° C., at a pressure of 150 kg/cm at the input and 50 kg/cm at the outlet.

The homogeneised mixture is cooled to 4° C. and kept at this temperature for one hour with slow stirring.

At this stage the vanill flavouring as well as the Aspartam are added.

The expansion is about 100%. At the outlet of the freezer, the ice cream is of a firmness comparable with that of the control, due to the very substantial increase in the amount of emulsifier-stabiliser.

The finished product is hardened at −40° C. for three hours, then preserved at −20° C. for 48 hours.

Quality tests are then run whose results are collected in Table II.

3. Ice Cream According to the Invention

The two ice creams prepared according to the invention have the following composition by weight:

| | Cream No.3 | Cream No.4 |
|---|---|---|
| HSH with 75% D.M. | 28.7 | 16.7 |
| Anhydrous milk fat | 8.4 | 8.4 |
| Mixture of delactosed milk proteins NOLLIBEL P 70 | 5.3 | 5.3 |
| 70% D.M. sorbitol syrup | 4.9 | 5.3 |
| Stabiliser emulsifier CREMODAN SE 30F | 0.48 | 0.48 |
| Aspartam | 0.02 | 0.02 |
| MERO vanilla flavouring | 0.35 | 0.35 |
| Water | qsp 100% | qsp 100%. |

The method of preparation is that of the preparation of the abovesaid sorbitol type ice cream, the HSH being added at the same time as the sorbitol syrup and the aspartam being added at the same time flavouring.

The HSH employed had the same composition as that used in Example 1.

The ice cream No. 3 had a content of polyols of DP≧3 equal to 8.9% and the ice cream No. 4 a content equal to 5.76%. Their content of lactose was equal to 0.8%.

The results of the quality tests are collected in Table II.

TABLE II

| | D.M. % | PENETRABILITY (in mm) | MELTING | | TASTE | | | | |
|---|---|---|---|---|---|---|---|---|---|
| | | | Appearance of first drop (in min.) | 60%* melted (in min.) | Sweet Flavor** | Cutting Resistance** | Melting Speed** | Viscosity Fluidity*** | Granulosity Unctuosity*** |
| Saccharose Type Ice Cream | 39.55 | 14.75 | 8'2" | 20'48 | 6 | 3.5 | 7 | 3 | 3 |
| Sorbitol Type Ice Cream | 40.05 | 23 | 6'30 | 14'30 | 5.5 | 2.5 | 8.1 | 3 | 2 |
| Ice Cream No. 3 | 39.50 | 16.6 | 7'56 | 18'42 | 6 | 3 | 7 | 2.5 | 3 |
| Ice Cream No. 4 | 39.60 | 18 | 7' | 17'30 | 6 | 2.5 | 7.5 | 2 | 2.5 |

*Time necessary for 60% by weight of the ice cream to be melted
**Marks from 0 to 10
***Marks from 0 to 5

On examination of the results collected in Table II, it is observed that the ice cream formulated by means of sorbitol syrup alone, develops an unctuosity less than that of the control.

The incorporation of polyols of DP≧3 enables a distinct improvement in this unctuosity to be obtained and the other characteristics to be brought close to those of the saccharose type control ice cream.

The ice cream No. 3, which includes a ratio of polyols of DP≧3 equal to 8.9%, is superior in all respects to ice cream No. 4.

The tasters adjudged very favourably and unanimously characteristics of organolepsis, of body, of texture and of firmness in the mouth of the ice creams according to the invention.

As self evident and as emerges already besides from the foregoing, the invention is in no way limited to those of its types of application and embodiments which have been more particularly envisaged; it encompasses, on the contrary, all modifications.

We claim:

1. In a sugarless ice cream comprising lactose-containing skimmed milk, fats, stabilisers and emulsifiers, flavors, artificial sweeteners, the improvement wherein the said sugarless ice cream comprises as a sweetening and textural agent, an amount of polyols of DP≧3 of more than 2% and of less than 15% by weight expressed in dry matter in the finished product.

2. A sugarless ice cream according to claim 1, wherein the amount of polyols of DP≧3 is higher than 3% and less than 15% by weight expressed in dry matter in the finished product.

3. A sugarless ice cream according to claim 1, wherein the amount of polyols of DP≧3 is higher than 6% and less than 12% by weight expressed in dry matter in the finished product.

4. In a sugarless ice cream according to claim 1, the improvement wherein the skimmed milk is replaced by a dairy protein concentrate selected from the group consisting of:
   caseinates,
   ultra-filtered milk proteins,
   ultra-filtered serum proteins,
   buttermilk and ultra-filtered buttermilk,
   heat-coagulated delactosed serum proteins,
the resulting lactose content of the ice cream being less than 1% by weight expressed in dry matter in the finished product.

5. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 2% and less than 15% by weight expressed in dry matter in the finished product.

6. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 3% and less than 15% by weight expressed in dry matter in the finished product.

7. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 6% and less than 12% by weight expressed in dry matter in the finished product.

8. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 2% and less than 15% by weight expressed in dry matter in the finished product, these polyols being introduced in the form of an HSH (hydrogenated starch hydrolysate) having, before hydrogenation, a DE comprised between 25 and 75, the composition of said HSH being:
   sorbitol (DP 1): 0.1 to 35%,
   maltitol (DP 2): 8 to 80%,
   polyols of DP≧3: complement to 100.

9. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 3% and less than 15% by weight expressed in dry matter in the finished product, these polyols being introduced in the form of an HSH having, before hydrogenation, a DE comprised between 25 and 75, the composition of said HSH being:
   sorbitol (DP 1): 0.1 to 19%,
   maltitol (DP 2): 20 to 75%,
   polyols of DP≧3: complement to 100.

10. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 6% and less than 12% by weight expressed in dry matter in the finished product, these polyols being introduced in the form of an HSH having, before hydrogenation, a DE comprised between 30 and 60, the composition of said HSH being:
   sorbitol (DP 1): 0.1 to 19%,
   maltitol (DP 2): 20 to 75%,
   polyols of DP≧3: complement to 100.

11. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 2% and less than 15% by weight expressed in dry matter in the finished product, these polyols being introduced in the form of an HSH having, before hydrogenation, a DE comprised between 25 and 75, the composition of said HSH being:
   sorbitol 0.1 to 19%
   maltitol 35 to 80%,
   polyols of DP>20 percentage less than 3%
   polyols of DP ranging from 3 to 20 complement to 100%.

12. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 3% and less than 15% by weight expressed in dry matter in the finished product, these polyols being introduced in the form of an HSH having, before hydrogenation, a DE comprised between 25 and 75, the composition of said HSH being:
  sorbitol 0.1 to 19%
  maltitol 35 to 80%,
  polyols of DP>20 percentage less than 3%
  polyols of DP ranging from 3 to 20 complement to 100%.

13. Process for preparing a sugarless ice cream according to claim 1, said process comprising, adding to a mixture of skimmed milk, fat, stabilising and emulsifying agents, flavouring and artificial sweeteners, an amount of polyols of DP≧3 such that the content of the resulting ice cream in these polyols is higher than 6% and less than 12% by weight expressed in dry matter in the finished product, these polyols being introduced in the form of an HSH having, before hydrogenation, a DE comprised between 30 and 60, the composition of said HSH being:
  sorbitol 0.1 to 19%
  maltitol 35 to 80%,
  polyols of DP>20 percentage less than 3%
  polyols of DP ranging from 3 to 20 complement to 100%.

14. Process according to claim 8, wherein the proportion of HSH introduced into the ice cream is such that the content of ice cream in HSH is comprised between 4.5% and 28%, the percentages being expressed in dry matter in the finished product.

15. Process according to claim 8, wherein the proportion of HSH introduced into the ice cream is such that the content of ice cream in HSH is comprised between 6% and 23%, the percentages being expressed in dry matter in the finished product.

16. Process according to claim 11, wherein the proportion of HSH introduced into the ice cream is such that the content of ice cream in HSH is comprised between 4.5% and 28%, the percentages being expressed in dry matter in the finished product.

17. Process according to claim 11, wherein the proportion of HSH introduced into the ice cream is such that the content of ice cream in HSH is comprised between 6% and 23%, the percentages being expressed in dry matter in the finished product.

18. Process for preparing in ice cream according to claim 4, wherein there is introduced into the composition of the latter, during its preparation and in place of the milk products, an amount from 3 to 8% by weight in the finished product, of milk protein concentrates containing a little proportion of lactose and selected from the group consisting of:
  caseinates,
  ultra-filtered milk proteins,
  ultra-filtered serum proteins,
  buttermilk and ultra-filtered buttermilk,
  heat-coagulated delactosed serum proteins.

19. Process for preparing an ice cream according to claim 4, wherein there is introduced into the composition of the latter, during its preparation and in place of the milk products, an amount from 4 to 7% by weight in the finished product, of milk protein concentrates containing a little proportion of lactose and selected from the group consisting of:
  caseinates,
  ultra-filtered milk proteins,
  ultra-filtered serum proteins,
  buttermilk and ultra-filtered buttermilk,
  heat-coagulated delactosed serum proteins.

* * * * *